June 27, 1961  W. E. RASMUSSEN  2,989,876
GEAR SHIFT MECHANISM

Filed June 8, 1959  2 Sheets-Sheet 1

INVENTOR.
Walter E. Rasmussen
BY
Atty.

June 27, 1961  W. E. RASMUSSEN  2,989,876
GEAR SHIFT MECHANISM
Filed June 8, 1959  2 Sheets-Sheet 2
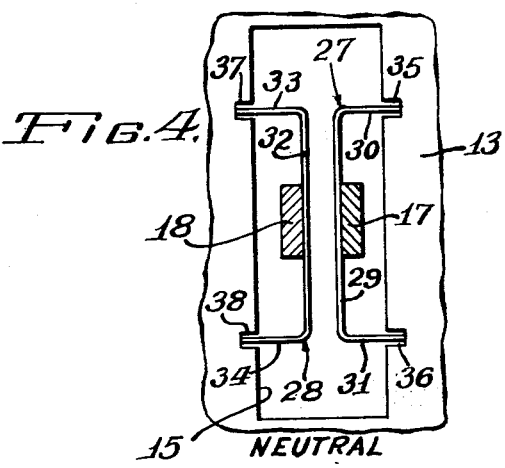
Fig. 4. NEUTRAL
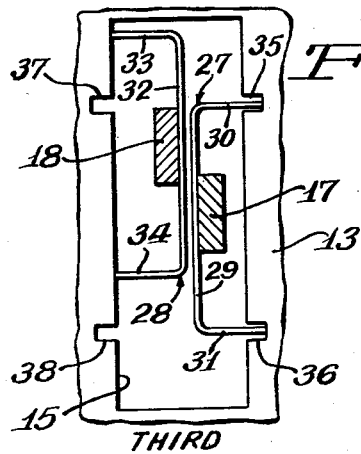
Fig. 7. THIRD
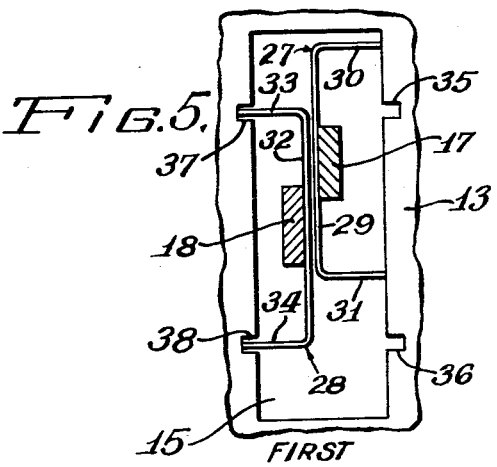
Fig. 5. FIRST
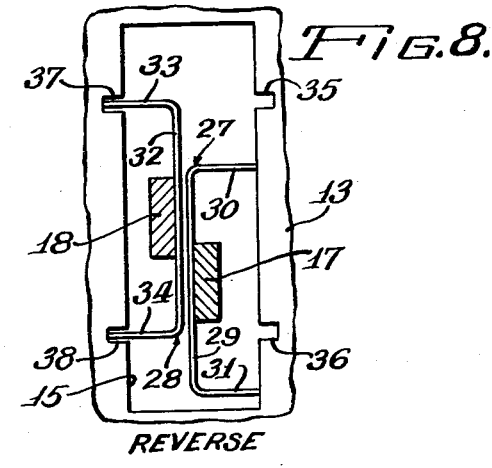
Fig. 8. REVERSE
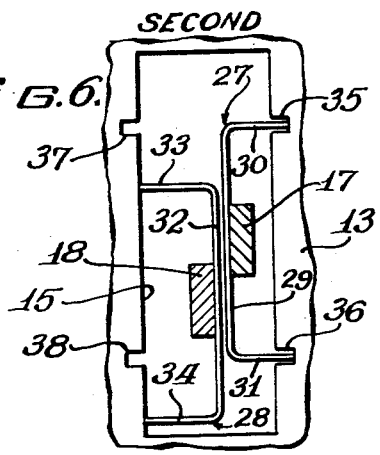
Fig. 6. SECOND
INVENTOR.
Walter E. Rasmussen
BY
Paul O. Pippel
Atty.

United States Patent Office 2,989,876
Patented June 27, 1961

2,989,876
GEAR SHIFT MECHANISM
Walter E. Rasmussen, Moline, Ill., assignor to International Harvester Company, Chicago, Ill., a corporation of New Jersey
Filed June 8, 1959, Ser. No. 818,854
4 Claims. (Cl. 74—483)

This invention relates to a new and improved gear shift mechanism.

There have been many gear shift mechanisms used and developed for vehicles, some of which have been relatively simple and some more complex. However, the object of all of the gear shift mechanisms is to cause the engagement of different gear ratios in a transmission or the like.

It is a principal object of the present invention to provide a simple yet effective gear shift mechanism for effecting the shifting of gear ratios.

An important object of this invention lies in the provision of means for effecting a shifting of gear ratios in a multiple speed transmission device and wherein there is an effective interlock between the shifting mechanism to prohibit shifting from the higher speed ratios of the transmission into reverse position of the transmission without preliminarily engaging a neutral position of the transmission.

Another important object of this invention is to supply a gear shift actuating mechanism in which there is employed two shift levers engageable by an operator and arranged and constructed so that when one such gear shift lever is in any gear ratio setting position the other gear shift lever may not be moved from its neutral position.

Another and still further important object of this invention is to equip a gear shift mechanism with means wherein the actuating mechanism prohibits the engagement of more than one gear ratio setting at any one time.

Other and further important objects and advantages will become apparent from the disclosures in the following specification and accompanying drawings.

In the drawings:

FIGURE 4 is an enlarged sectional view taken on the line 4—4 of FIGURE 3 and showing the top surface of the gear shift lever mechanism and its housing opening.

FIGURE 5 is a sectional view similar to FIGURE 4 but with the gear shift lever in a position corresponding to the first gear ratio in the transmission having its speed adjustable;

FIGURE 6 is a sectional view similar to FIGURES 4 and 5 but with the gear shift mechanism in a position representing second speed for the transmission;

FIGURE 7 is a sectional view similar to FIGURES 4, 5 and 6 but with the gear shift mechanism in a position representing third gear ratio for the transmission; and FIGURE 8 is another sectional view similar to the device of FIGURES 4 to 7 inclusive wherein the gear shift mechanism is in a position designating a reverse ratio for the transmission.

Figure 2:
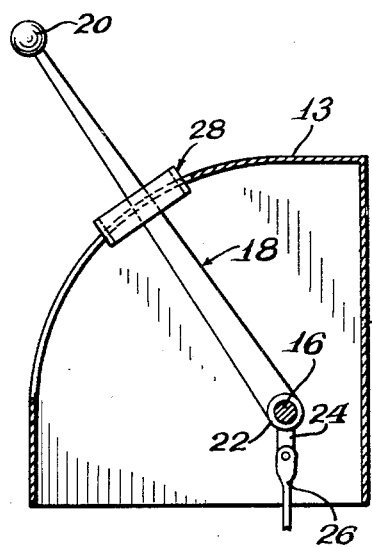
FIGURE 2 is a sectional view taken on the line 2—2 of FIGURE 1.
Figure 3:
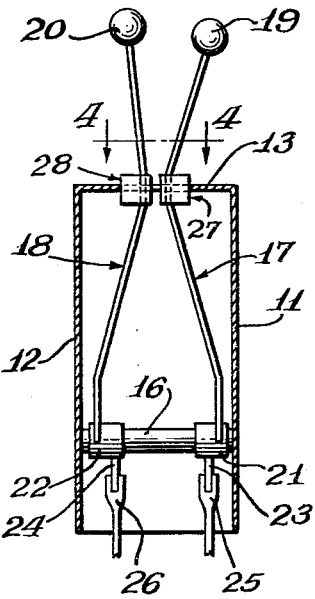
FIGURE 3 is a sectional view taken on the line 3—3 of FIGURE 1.
Figure 1:
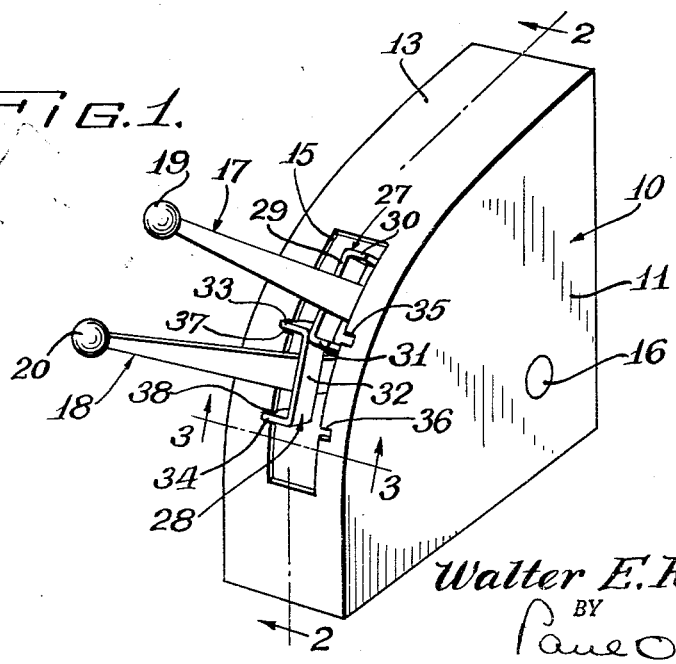
FIGURE 1 is a perspective view showing the gear shifting mechanism of this invention.

As shown in the drawings the reference numeral 10 indicates generally a housing for the gear shift mechanism of this invention. The particular gear transmission has not been shown inasmuch as it forms no specific part of the present invention. It should be understood that any change speed gear transmission may be employed and be utilized with the shifter mechanism of the device depicted herein. The housing 10 for the shifter mechanism comprises side walls 11 and 12 defining arcuate segments which are joined by a curved top 13 as best shown in FIGURES 1, 2 and 3. As viewed in FIGURE 2, it is evident that the housing 10 has its top 13 continued downwardly and forwardly forming a front. A back wall 14 joins the side walls 11 and 12 to completely close the gear shift mechanism from the top and sides whereas the bottom is open to permit linkage members to depend downwardly therefrom and engage a gear transmission.

The combination top and front surface as designated by the numeral 13 has an opening 15 therein which is generally rectangular in shape but is disposed in an arcuate plane coincident with the curved surface of the top and front member 13 of the housing 10. A shaft 16 is mounted in the housing 10 between the walls 11 and 12 as shown in FIGURE 3. This shaft 16 is shown as fixedly mounted in the housing 10 although it could be arranged to have the shaft journally mounted and still accomplish the same gear shift control mechanism. However, the shaft 16 as shown is stationary and it has mounted thereon upwardly extending lever members 17 and 18. These levers 17 and 18 are disposed generally side by side and are equipped with hand engaging knobs or the like 19 and 20 respectively at their upper ends. The lower ends of the operating levers 17 and 18 are provided with sleeve-like members 21 and 22 respectively which are journally mounted on the shaft 16. The shaft 16 thus acts as a pivotal mounting for the arcuate swinging movement of either or both of the operating levers 17 and 18 through the extent of the rectangular arcuate shaped slot 15 as shown in FIGURES 1 and 2. Each of the sleeves 21 and 22 is provided with a downwardly depending finger or the like 23 and 24 respectively. These fingers thus have arcuate swinging movement about the shaft 16 when the levers 17 or 18 are swung through an arcuate path about the shaft 16. The fingers 23 and 24 are engaged by links 25 and 26 which in turn depend downwardly into a gear shifting transmission (not shown). It is the function of these links 25 and 26 to effect a shifting of the gear ratios of a transmission.

As shown in FIGURES 1, 2 and 3, the operating levers 17 and 18 are equipped with integral short U-shaped or channel members 27 and 28 respectively. The U-shaped member 27 is provided with a back 29 and outwardly projecting legs 30 and 31. The back 29 is affixed to the lever 17 by means of welding or the like. The U-shaped bracket 27 is thus integral with the lever 17 and is adapted to move with the lever during its arcuate movement about the shaft 16 as a center. Similarly the bracket 28 has a back wall 32 and outwardly projecting legs 33 and 34. The back wall 32 is fastened by means of welding or the like to the lever 18 to thereby insure movement of the bracket with the lever 18 in an integral fashion as the lever 18 is swung about its axis 16.

The integral U-shaped brackets 27 and 28 on the operating levers 17 and 18 are employed to effect an interlock between the levers 17 and 18 and thereby prevent operation or movement of one lever from its neutral position when the other lever is in a position to engage one of the gear ratios of the adjustable speed transmission. Spaced apart notches 35 and 36 are provided in the top and front arcuate surface 13 on the side of its relatively elongated rectangular opening 15 as shown in FIGURE 1 for engagement by the bracket 27 of the lever 17. Similarly, notches 37 and 38 are provided on the other side of the rectangular opening 15 adjacent the lever 18 and its bracket 28. The spacing of the inwardly opening notches 35 and 36 is equal to the spacing between the legs 30 and 31 of the U-shaped bracket 27 and similarly the spacing of the notches 37 and 38 is the same as the spacing between the legs 33 and 34 of the U-shaped bracket member 28 associated with the lever 18. Further, the notches 35 and 37 are in transverse alignment across the face of the housing 10 and similarly the notches 36 and 38 are in transverse alignment. This alignment of the notches and the positioning of the lever brackets with respect thereto is clearly shown in FIGURES 4 to 8 inclusive.

Both levers 17 and 18 are depicted in neutral position in FIGURE 4 wherein the legs of the brackets 27 and 28 engage their respective notches 35 and 36 and 37 and 38. No arcuate movement of the levers 17 and 18 may be had without preliminarily moving the bracket member legs out of their engagement with the inwardly opening notches in the surface 13 of the housing 10. The operating levers 17 and 18 are made of relatively resilient material such as spring steel and thus have a give so that when it is desired to effect a shifting of the transmission gear ratios such as from neutral to a first gear engagement depicted by FIGURE 5 the lever 17 may be swung toward the lever 18 thus freeing the bracket legs 30 and 31 from their engaged notches 35 and 36 at which time the lever 17 may then be swung arcuately. To attain the position of the lever 17 as shown in FIGURE 5 it is swung forwardly and upwardly. The position of the lever 17 in FIGURE 5 designates a first speed gear ratio of the transmission. In this position of the shifter mechanism the U-shaped bracket 27 closely abuts the U-shaped brackets 28 of the lever 18 thus holding the lever 18 in its neutral position. In other words, when the one lever is in a particular gear ratio position other than neutral the other lever may not be removed from its neutral position notches. This is true because the overall width of the combined legs of the two U-shaped members exceeds the width of the rectangular slot 15 in the surface 13 of the housing 10.

Now in order to shift the gear mechanism into its second speed ratio the lever 17 is moved back to its neutral or central position wherein the natural spring tendency of the lever 17 causes the leg members 30 and 31 of the U-shaped bracket 27 to engage the notches 35 and 36 in the side of the rectangular slot 15. In this position there is thus provided adequate clearance for the lever 18 to be swung against its spring tendencies so that it abuts or substantially abuts the bracket 27 thereby freeing the outer ends of the legs 33 and 34 from engagement with the notches 37 and 38 respectively to permit arcuate swinging of the lever 18 into either one of two positions for providing a different gear ratio. FIGURE 6 shows the gear shift mechanism in its predetermined second gear ratio position wherein the lever 18 has been swung downwardly in the slot or opening 15. In the device of FIGURE 7 the lever 18 has been swung upwardly to the third speed ratio position of the transmission and in the meantime the operating lever 17 has remained with its U-shaped member legs 30 and 31 in engagement with the inwardly opening notches 35 and 36. It is obvious under all conditions of this device that only one gear ratio setting can be obtained at any one time with the interlocking arrangement of gear shift operating levers as shown and described herein. In the device as shown in FIGURE 8 the lever 18 has been moved to a central position in the opening 15 wherein it engages the neutral slots or notches 37 and 38 permitting the lever 17 to be swung downwardly to a reverse ratio setting for the gear shift transmission.

In addition to providing that only one gear ratio shall be engaged at any one time with this mechanism there is also provided means whereby a reverse gear ratio setting may not be obtained until or after the device has been in a neutral position and may not be directly engaged from the second or third gear ratio setting without a temporary halting in a neutral position. The construction is such that reverse may not be reached from the lever 18 controlling the high gear ratios but only from the lever 17 controlling the low gear ratio as shown and described. The lever 17 controls the engagement of the low ratio and reverse gear ratio so that it alone may be employed to engage the reverse drive. This provides a safety factor and prevents direct engagement of reverse from either second or third gear ratio settings inasmuch as the second and third gear ratio settings are obtained by movement of the operating lever 18 rather than the operating lever 17 which controls the engagement of first or low gear ratio and reverse.

I am aware that numerous details of construction may be varied throughout a wide range without departing from the principles disclosed herein and I therefore do not propose limiting the patent granted hereon otherwise than as necessitated by the appended claims.

What is claimed is:

1. A gear shift mechanism comprising a housing, a shaft carried in such housing, spaced apart hand operated levers mounted on said shaft, said levers having arcuate movement about said shaft as a center, said housing having an elongated opening therein through which said levers may be arcuately swung, said housing having inwardly opening notches into said elongated opening, projection means fixed to and forming a part of said levers for engaging the inwardly opening notches, and the width of the combined projections exceeding the width of the elongated opening, and the combined width of the projections being substantially equal to the width of the opening plus the depth of one inwardly opening notch.

2. A device as set forth in claim 1 in which each of said lever means is yieldably moveable toward each other and normally tends to swing outwardly toward the lateral edge of the elongated opening.

3. A device as set forth in claim 1 in which said projection means comprises a U-shape channel member having a back portion fixedly attached to one of said lever means and having outwardly projecting spaced apart side leg members for cooperative engagement with the inwardly opening notches.

4. A device as set forth in claim 3 in which the neutral position of the gear shift mechanism is attained when the U-shape leg members engage the inwardly opening notches and whereby only one of said levers may be disengaged from said notches at one time thus insuring that even though there are two gear shift levers there may only be one gear ratio setting at any one time.

References Cited in the file of this patent

UNITED STATES PATENTS 748,156     Bement                Dec. 29, 1903
823,522     Gramm               June 19, 1906